(12) United States Patent
Udd

(10) Patent No.: US 7,379,304 B2
(45) Date of Patent: May 27, 2008

(54) HUB IDU CARD INSERT PANEL AND METHOD

(75) Inventor: Thomas Edward Udd, Sultan, WA (US)

(73) Assignee: Harris Corporation, Melbourne, FL (US)

( * ) Notice: Subject to any disclaimer, the term of this patent is extended or adjusted under 35 U.S.C. 154(b) by 777 days.

(21) Appl. No.: 09/893,440

(22) Filed: Jun. 29, 2001

(65) Prior Publication Data

US 2002/0106935 A1 Aug. 8, 2002

Related U.S. Application Data

(60) Provisional application No. 60/266,485, filed on Feb. 6, 2001.

(51) Int. Cl.
*H05K 7/20* (2006.01)
(52) U.S. Cl. .................. 361/719; 439/564; 439/573
(58) Field of Classification Search ........ 361/796–801, 361/788, 825, 683, 685; 439/564, 573, 472, 439/881
See application file for complete search history.

(56) References Cited

U.S. PATENT DOCUMENTS

| | | | | |
|---|---|---|---|---|
| 5,099,391 A | * | 3/1992 | Maggelet et al. ........... 361/736 |
| 5,545,057 A | * | 8/1996 | Tan et al. ................. 439/540.1 |
| 5,576,935 A | * | 11/1996 | Freer et al. .................. 361/785 |
| 5,664,950 A | * | 9/1997 | Lawrence ................... 439/76.1 |
| 5,833,494 A | * | 11/1998 | Diaz ........................... 439/573 |
| 6,144,561 A | * | 11/2000 | Cannella, Jr. et al. ...... 361/796 |
| 6,190,204 B1 | * | 2/2001 | Huang ......................... 439/607 |
| 6,301,104 B1 | * | 10/2001 | Hu ............................... 361/684 |
| 6,542,382 B2 | * | 4/2003 | BuAbbud et al. ........... 361/816 |
| 6,558,201 B1 | * | 5/2003 | Begley et al. .............. 439/638 |

* cited by examiner

*Primary Examiner*—P. Austin Bradley
*Assistant Examiner*—Thanh S Phan
(74) *Attorney, Agent, or Firm*—Duane Morris LLP

(57) ABSTRACT

An insert panel assembly for the IDU cards at the hub of a point-to-multipoint millimeter wave wireless communication system. Generic cards with terminations for the selective connection of remote transceivers are provided with an apertured faceplate over which an insert panel may be placed to selectively block access to the card terminations. In one embodiment, the insert carries adaptors and another embodiment the connector on the conductor from the transceiver is configured to attach to the faceplate. In both embodiments the weight of the connector and conductor is supported by the chassis and not by the card. The connector is angled downwardly to avoid stress on the conductor and reduce the likelihood of kinking.

24 Claims, 3 Drawing Sheets

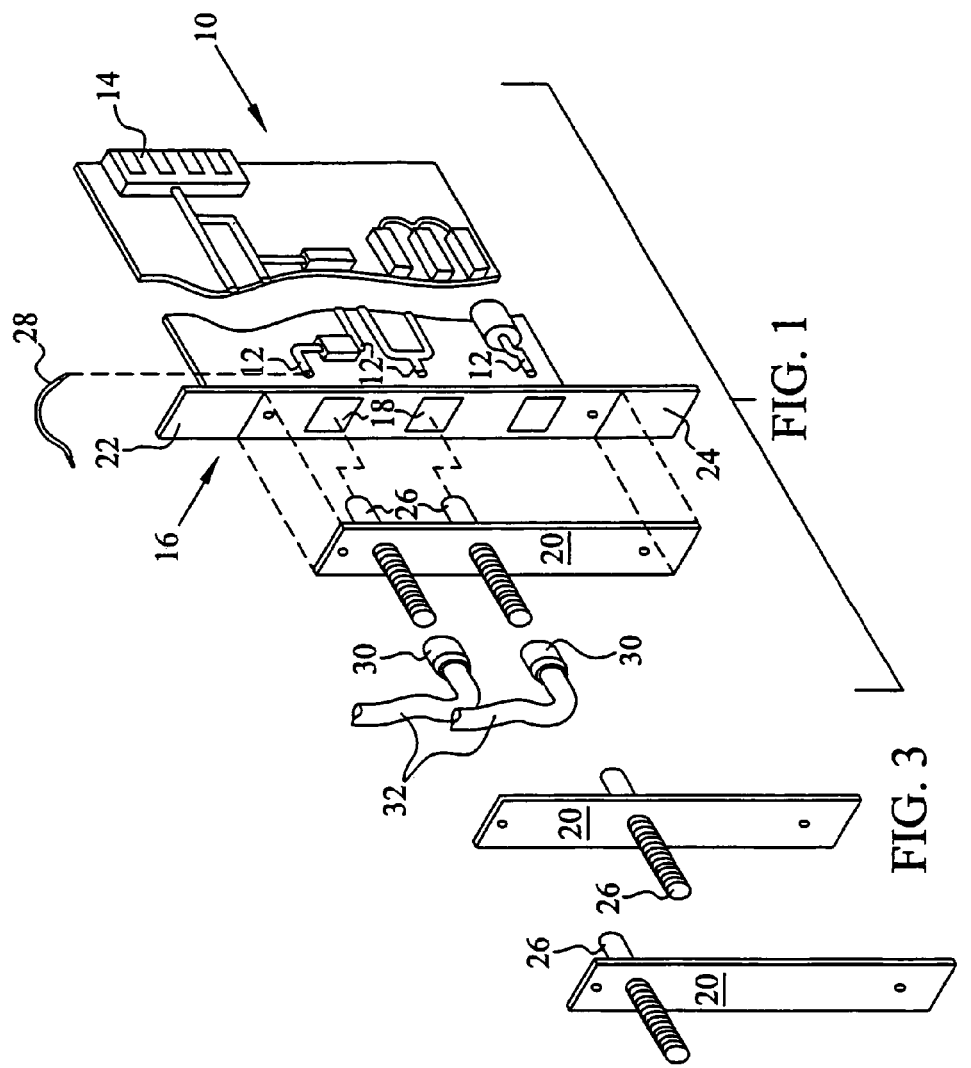

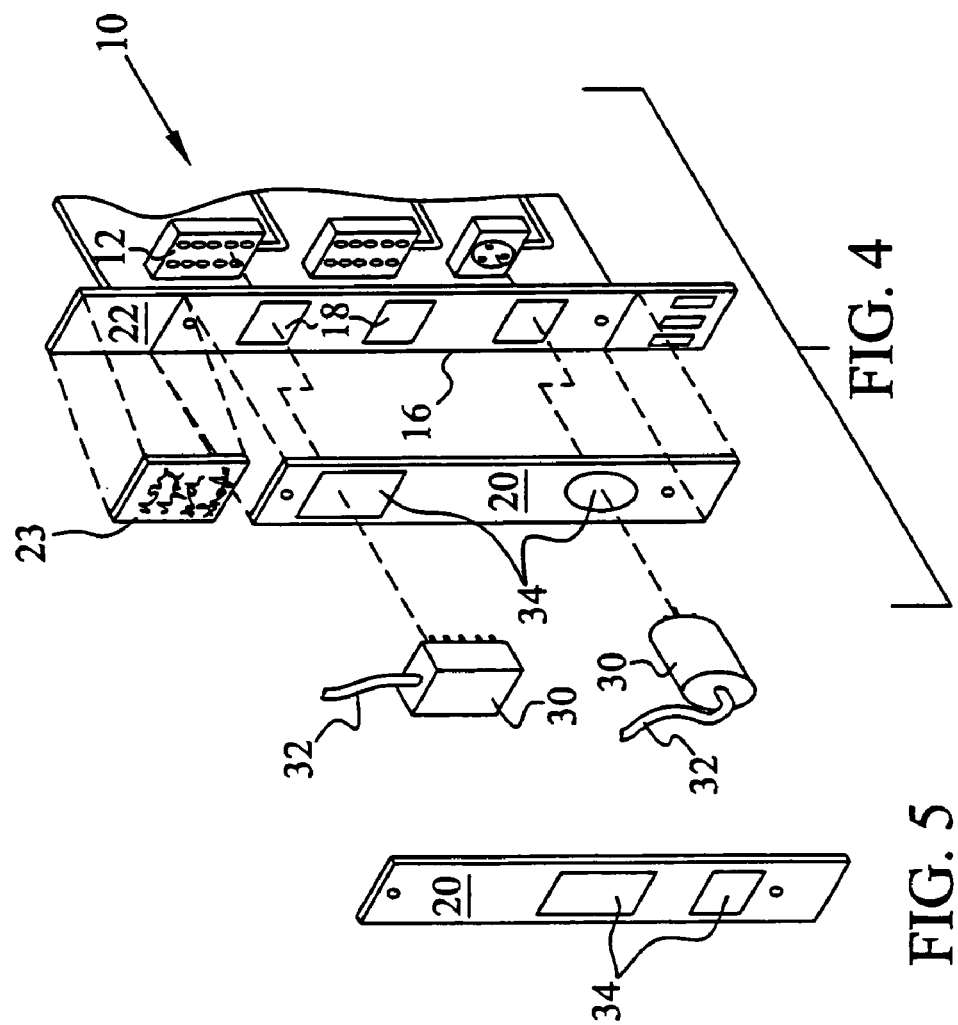

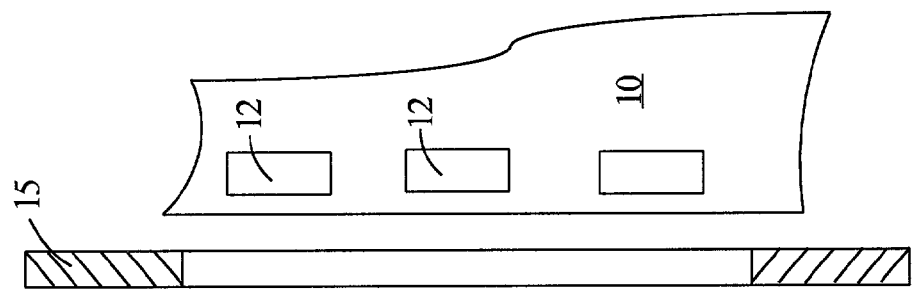
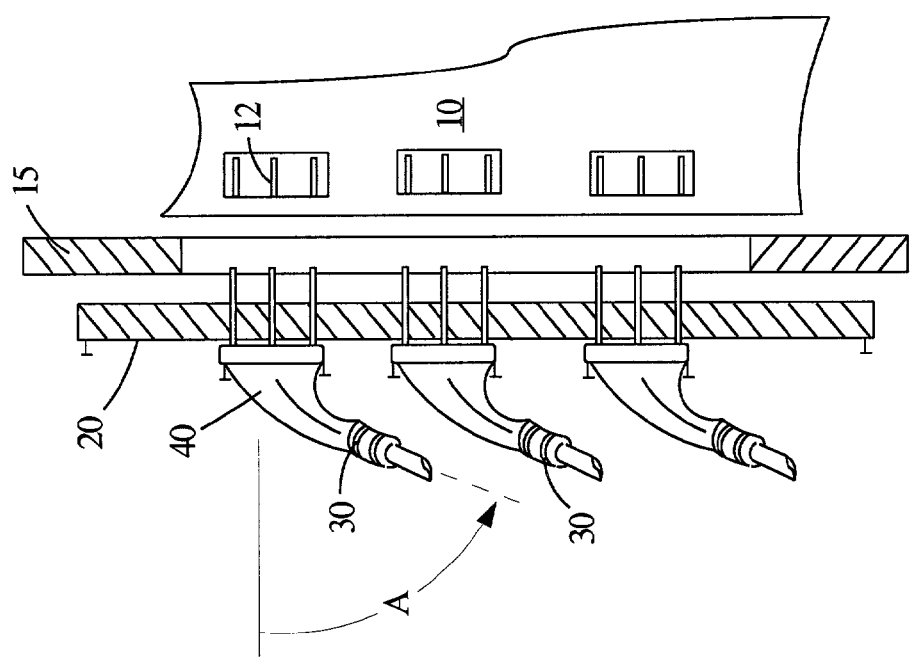

HUB IDU CARD INSERT PANEL AND METHOD

The present application claims the priority of now abandoned U.S. Provisional Application Ser. No. 60/266,485 filed Feb. 6, 2001 for "Antenna Provisional," the disclosure of which is hereby incorporated herein by reference. This application is related to commonly assigned U.S. patent application Ser. No. 09/893,010, entitled Spring Loaded Antenna Mounting System and Method; Ser. No. 09/893,013, entitled Geared Antenna Aiming System and Method; and Ser. No. 09/893,007, entitled Antenna Quick Connect System and Method, the disclosures of which are hereby incorporated herein by reference.

BACKGROUND

The present invention relates generally to the attachment of remote peripherals to chassis mounted cards, and more specifically to the attachment of remote transceivers to the printed circuit cards at the hub of a millimeter wave point-to-multipoint communication systems.

Point-to-multipoint millimeter wave wireless communication systems are well know and are described, e.g., in the commonly assigned U.S. Pat. No. 6,016,313, entitled "System and Method for Broadband Millimeter Wave Data Communication." Such systems generally consist of one or more hubs each servicing a plurality of remote nodes. The antennae of such systems are highly directional and it is critical to the successful operation of the communication system that the signals received at the hub be correctly routed to an antenna correctly aimed in both azimuth and elevation. It is typical that a hub contain multiple antennae and thus multiple cards in the hub equipment.

Point-to-multipoint communication systems are generally modular with reconfiguration of the coverage of the antennae required, e.g., as the number of subscribers increases within a sector, as subscribers come on line in sectors previously not serviced, as the communication traffic increases within a sector, etc. It is thus important that the hub equipment include a chassis capable of supporting multiple cards usable with various transducers, and that the access to the terminations on those cards be selectively restricted to avoid erroneous connections. It is accordingly an object of the present invention to provide a system and method for selectively connecting peripherals such as transducers to printed circuit cards.

Printed circuit cards are generally electrically attached by frictional connectors to the back plane or mother board mounted in a metal chassis, but the cards are not generally expected to be exposed to movement inducing forces once installed. The terminations of printed circuit cards are often the male or female halves of a multiple pin connector and are accessible through the faceplate of the card. Such terminations are secured to the card but are not expected to subject to movement inducing forces once the card is installed into the protective chassis. Any force on the terminations may result in damage to the connection to the card and/or cause movement of the card relative to the chassis and disrupt the connection of the card to the back plane.

The connector on the conductor from the remote peripheral is generally plugged directly into the card termination. The weight of the connector on the peripheral conductor as well as the weight of the conductor itself has long been a problem in the connection of remote peripherals, as this weight is supported by the termination on the card and tends to cause unwanted movement under the influence of gravity and/or the movement of the peripheral conductor. It is therefore another object of the present invention to provide a novel card connector and method in which the connector is supported by the chassis rather than the card.

The angle of insertion of the connector from the peripheral is generally normal to the card faceplate and parallel to the surface of the card to which the termination is mounted. It is not unusual for the conductors to transition from the horizontal to the vertical and/or laterally to one side of the chassis within an inch or two of the chassis The sharpness of this bend is increased where the conductor is long and the weight of the conductor substantial. The sharp radius of the curve induces stress in the conductor itself and on the card to which connected. It is accordingly a further object of the present invention to provide a novel card connecting system and method in which the sharpness of the bend in the conductor is significantly reduced These and other objects and advantages will be readily apparent from the following detailed description of illustrative embodiments when read in conjunction with the appended drawings.

BRIEF DESCRIPTION OF THE DRAWINGS

FIG. 1 is an exploded pictorial view of a printed circuit card with one embodiment of the insert panel of the present invention.

FIG. 2 is a pictorial view of an alternative configuration of the insert panel of FIG. 1.

FIG. 3 is a pictorial view of a further alternative configuration of the insert panel of FIG. 1.

FIG. 4 is an exploded pictorial view of a printed circuit card with a second embodiment of the insert panel of the present invention.

FIG. 5 is a pictorial view of an alternative configuration of the insert panel of FIG. 4.

FIG. 6 is a slightly exploded pictorial view of a third embodiment of the panel of the present invention illustrating the sue of selectively chosen adaptors.

FIG. 7 is an exploded pictorial view of a fourth embodiment of the insert panel of the present invention illustrating the use of angled integral adaptors

DETAILED DESCRIPTION

FIG. 1 illustrates a typical printed circuit card having a number of terminations 12 and at least one connection 14 to the back plane of the chassis 15 (not shown in FIG. 1). The card 10 includes a faceplate 16 which is visible externally of the chassis when the card is installed therein. The faceplate 16 includes plural apertures 18 which provide access to the terminations 12 of the card.

An insert panel 20 is desirably less in area than the surface of the faceplate 16 s to leave an area 22 to which a label 23 may be attached indication the identity and/or use of the card. Other areas 24 may be provided for diodes or other indicators of the operation of the card. The insert panel 20 may be removably attached to the faceplate 16 in any suitable conventional manner such a threaded fasteners or the like.

As shown in FIGS. 1-3, the insert panel 20 may include one or more throughpanel connectors or adaptors 26 permanently mounted thereto in locations corresponding to the apertures 18 in the faceplate, so that, with the panel 20 overlying the faceplate 18, the distal or internal end of the connector 26 extends through the aperture 18 in the faceplate 16 into proximity to the terminations 12 of the card.

Once installed, a jumper cable or other flexible conductor 28 may be used to establish an electrical connection between the connector 26 and the termination 12. Where the terminations 12 are connectors, the distal end of the connecter 26 may plug directly thereto.

The proximate end of the connector 26 may be configured in any suitable conventional way to mate with the connector 30 on the conductor 32 operatively attached to the peripheral equipment (not shown).

In the embodiment illustrated in FIG. 1, the conductor 30 is supported by the panel and in turn by the chassis which also supports the card 10. This eliminates the force which otherwise may have to be supported by the terminations 12 of the card. The use of a flexible connection between the distal end of the connector 26 and the termination 12 also serves to reduce the forces applied to the card.

Clearly, the selection of a panel with the ports thereof located in predetermined locations limits access to the terminations of the card. This may be an advantage where, e.g., a card has terminations leading to circuits to which a particular entity has not subscribed. Limiting the accessibility of the terminations may also be an advantage in the installation and reconfiguration of the equipment.

In the embodiment illustrated in FIG. 4 where like numerical designations are used for like elements, the terminations 12 are shown as connectors which are accessible through the apertures 18 in the faceplate 16. The insert panel 20 may also include apertures located in alignment with the apertures 18 of the faceplate so that the connector 30 on the end of the conductor 32 from the peripheral equipment may plug directly into the termination 12 through the aligned apertures 34 and 18. As shown in FIG. 5, the apertures may vary in size and location to selectively limit access to the terminations 12 of the card 10.

As illustrated in FIG. 4, the terminations 12 of the card must resist the forces placed thereon by the connectors 30 and conductors 32. However, and as suggested in the adaptors 40 illustrated in FIG. 6, the connectors 30 of FIG. 4 may be provided with any suitable conventional means for attachment to the faceplate 20 so that the forces from the connector 30 and conductor 32 may be transferred to the faceplate 20 rather than to the card 10.

In many cases the weight of the connector 30 and the conductor cause a sharp bend in the conductor 32 because of the effects of gravity. In other instances, the location of the peripheral equipment dictates the direction the conductor 32 must take from the card 10, and that direction may be up as suggested in FIGS. 1 and 4, down as suggested in FIGS. 6 and 7, or laterally.

The sharpness of the bend in the conductor 32, however induced, increases the stress in the conductor 32. Where the direction the conductor 32 must take is known, the insert panel 20 may include ports 40 angled in that known direction. By the use of such angled ports, the internal wiring may be manufactured to obviate bending stress and the conductor 32 and its connector 30 may remain axial with the port 40.

As shown in FIG. 6, the ports 40 permanently attached to the insert panel 20 in FIG. 7 transfer the support of the connection to the peripheral to the chassis 15 by the panel 20. However, the ports may be adaptors individually selected and attached to the insert panel 20 by any suitable conventional means. In this way, the forces from the connector 30 of the peripheral may be transferred to the adaptor 40 through the panel 20 to the chassis 15. In addition, great flexibility is provided in the connection.

It should be understood that the foregoing description of preferred embodiments is illustrative only and that various changes, substitutions and alterations can be made herein without departing from the spirit and scope of the invention as defined by the appended claims.

What is claimed is:

1. A system for the selective attachment of a connector fitted conductor from a remote transceiver to one of a plurality of terminations on a printed circuit card installed within the chassis of the hub equipment of a millimeter wave point-to-multipoint communications system, said system comprising:
   a chassis;
   a plurality of printed circuit cards operatively installed in said chassis, each of said printed circuit cards having a faceplate and a plurality of terminations each adapted for operative connection to a connector on the distal end of the conductor from a remote transceiver, said faceplate having a plurality of apertures in predetermined locations relative to said terminations;
   an insert panel carried by and overlying said faceplate, said panel having at least one adaptor for the selective connection on the external side thereof to the connector on the distal end of a conductor from a remote transceiver, each of said at least one adaptors being in alignment with one of the apertures in said faceplate so that the internal side of said adaptor extends therethrough in proximity to one of the terminations of said printed circuit card; and
   means for electrically connecting the internal side of said adaptor to one of said terminations,
   the support of said at least an adaptor by said faceplate removing the weight of the connector and conductor from the remote transceiver from the printed circuit card to which connected.

2. The system of claim 1 wherein said means for electrically connecting the internal side of each of said adaptors to said card is a jumper cable.

3. The system of claim 1 wherein said means for electrically connecting the internal side of each of said adaptors to said card is a connector carried by said card.

4. The system of claim 1 wherein the external side of each of said adaptors extends downwardly to reduce gravity induced stress in the conductor attached thereto.

5. The system of claim 4 wherein the downward angle is approximately forty five degrees below the horizontal.

6. The system of claim 4 wherein the downward angle is approximately forty five degrees below the horizontal.

7. The system of claim 1 wherein the external side of each of said adaptors extends downwardly to reduce gravity induced stress in the conductor attached thereto.

8. The system of claim 7 wherein the angle of the external side of said adaptor is between about forty and about sixty degrees below the horizontal.

9. A system for the selective attachment of a connector fitted conductor from a remote peripheral component to one of a plurality of terminations on a printed circuit card installed within the chassis of an electrical component without supporting any of the weight of the connector or the conductor by the printed circuit card, said system comprising:
   an electrical component having a chassis with at least one printed circuit card operatively installed therein, said printed circuit card having a faceplate and a plurality of terminations each adapted for operative connection to a connector on the distal end of the conductor from a remote peripheral component, said faceplate having a plurality of apertures in predetermined locations relative to said terminations;

an insert panel carried by and overlying said faceplate, said panel having at least one adaptor for the selective connection on the external side thereof to the connector on the distal end of a conductor from a peripheral component, each of said at least one adaptor being in alignment with one of the apertures in said faceplate so that the internal side of said adaptor extends therethrough in proximity to one of said terminations; and means for electrically connecting the internal side of said adaptor to one of said terminations, the support of said at least one adaptor said faceplate removing the weight of the connector and conductor from the peripheral component from the one of said terminations to which connected.

10. The system of claim 9 wherein said means for electrically connecting the internal side of each of said adaptor to said card is a flexible conductor.

11. The system of claim 9 wherein said means for electrically connecting the internal side of each of said adaptors to said card is a connector carried by said card.

12. In a system having a circuit card with a plurality of terminations adapted for selective operative connection to a remote peripheral component, and a faceplate with a plurality of apertures in predetermined locations relative to said terminations, wherein said operative connection is by way of a through-connector carried by an insert panel overlying and carried by said faceplate, the improvement wherein the external side of said through-connector is downwardly angled to reduce the stress on any attached conductor.

13. A system for the selective attachment of a connector fitted conductor from a remote transceiver to one of a plurality of terminations on a printed circuit card installed within the chassis of the hub equipment of a millimeter wave point-to-multipoint communications system, said system comprising:

a chassis;

a plurality of printed circuit cards operatively installed in said chasssis, each of said printed circuit cards having a faceplate and a plurality of terminations each adapted for operative connection to a connector on the distal end of the conductor from a remote transceiver, said faceplate having a plurality of apertures in predetermined locations relative to said terminations;

an insert panel carried by and overlying said faceplate, said insert panel having at least one aperture in a predetermined location relative to the apertures in said faceplate to thereby selectively control access of to said terminations through the apertures in said faceplate by a remote transceiver; and a means for supporting said connector by said insert panel to thereby reduce the weight of said connector on the terminations of said printed circuit card.

14. The system of claim 13 wherein the external side of said connector extends downwardly to reduce gravity induced stress in the conductor attached thereto.

15. In a system having a chassis for supporting a plurality of printed circuit cards, each of said cards having an apertured faceplate and a plurality of terminations for the selective operative attachment of a peripheral component, said system having plural peripheral components selectively operatively connected to one of said terminations, a method of supporting the connection between the peripheral components and the card comprising:

(a) overlaying an apertured insert panel on the faceplate so that access to one of the terminations is available through aligned apertures in the faceplate and the insert panel;

(b) attaching the insert panel to the chassis; and (c) supporting the connector of the peripheral equipment to the insert panel while electrically connecting the connector to one of the terminations so that the weight of the connector is carried by the chassis rather than the card.

16. In a system having a chassis for supporting a plurality of printed circuit cards, each of said cards having an apertured faceplate and a plurality of terminations for the selective operative attachment of a peripheral component, said system having plural peripheral components selectively operatively connected to one of said terminations, a method of supporting the connection between the peripheral components and the card comprising:

(a) providing an insert panel with at least one throughpanel adaptor;

(b) positioning the insert panel on the faceplate so that an adaptor extends through one of the apertures in the faceplate into proximity to one of the terminations;

(c) establishing an electrical connection between the adaptor and the one of the terminations; and (d) attaching the insert panel to the chassis to thereby support the connector of the peripheral equipment from the chassis rather than the termination to which electrically connected.

17. In a system having a chassis for supporting a plurality of printed circuit cards, each of said cards having an apertured faceplate and a plurality of terminations for the selective operative attachment of a peripheral component, said system having plural peripheral components selectively operatively connected to one of said terminations, a method of controlling the access of peripheral components to the cards comprising:

(a) providing an insert panel having electrical access port therethrough at a plurality of locations less than the number of apertures in the faceplate;

(b) positioning the insert panel in an overlying relationship to the faceplate with the ports of the insert panel aligned with selected apertures in the faceplate so that access to the terminations of the card is controlled.

18. The method of claim 17 wherein the ports are apertures.

19. The method of claim 17 wherein the ports are adaptors.

20. An insert panel for the apertured faceplate of a printed circuit card having a plurality of connectable terminations therein comprising:

a generally planar elongated panel adapted to be carried in an overlying relationship to the apertured faceplate of the printed circuit card;

a plurality of ports carried by said panel at predetermined locations along the length thereof corresponding to the location of selected apertures in the faceplate, wherein said selected apertures correspond to at least one of said plurality of terminations and said faceplate covers at least one of said plurality of terminations to control access to said connectable terminations.

21. The panel of claim 20 wherein said ports are apertures.

22. The panel of claim 20 wherein said ports are adaptors having an internal connection extending through an aperture in the faceplate when said panel is carried thereby.

23. The panel of claim 22 wherein the external portion said adaptors are downwardly angled to reduce the stress on any conductor connected thereto.

24. The panel of claim 23 wherein the angle is between about 40° and 60° below the horizontal.

* * * * *